V. T. JOHNSON & C. G. ARVIDSON.
DUST COLLECTOR.
APPLICATION FILED JULY 19, 1909.

964,428. Patented July 12, 1910.

Witnesses
A. H. Opsahl
Alice J. Swanson

Inventors
Victor T. Johnson
Carl G. Arvidson
By their Attorneys
Williamson & Merchant

UNITED STATES PATENT OFFICE.

VICTOR T. JOHNSON AND CARL G. ARVIDSON, OF MINNEAPOLIS, MINNESOTA.

DUST-COLLECTOR.

964,428. Specification of Letters Patent. Patented July 12, 1910.

Application filed July 19, 1909. Serial No. 508,334.

*To all whom it may concern:*

Be it known that we, VICTOR T. JOHNSON and CARL G. ARVIDSON, VICTOR T. JOHNSON being a citizen of the United States and CARL G. ARVIDSON being a subject of the King of Sweden, both residing at Minneapolis, in the county of Hennepin and State of Minnesota, have invented certain new and useful Improvements in Dust-Collectors; and we do hereby declare the following to be a full, clear, and exact description of the invention, such as will enable others skilled in the art to which it appertains to make and use the same.

Our invention has for its object to provide a highly efficient dust collector of simple construction, and to this end, it consists of the novel devices and combinations of devices hereinafter described and defined in the claim.

In the accompanying drawings which illustrate the improved dust collector, like characters indicate like parts throughout the several views.

Figure 1:
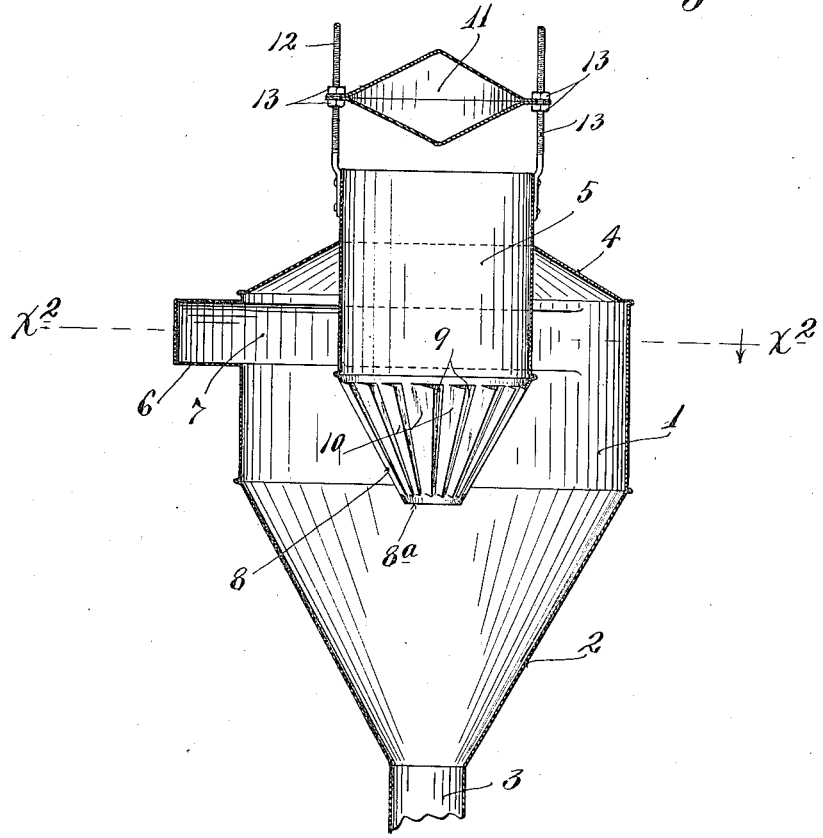
Figure 2:
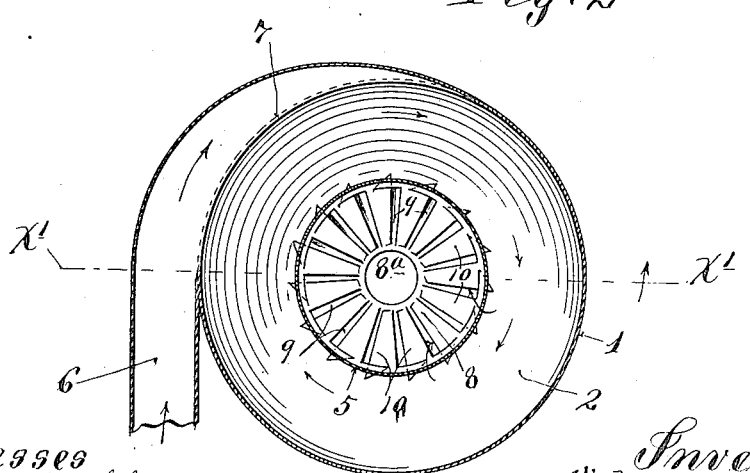

Referring to the drawings: Figure 1 is a vertical section taken through the improved dust collector on the line $x^1$ $x^1$ of Fig. 2; and Fig. 2 is a horizontal section taken through the dust collector on the line $x^2$ $x^2$ of Fig. 1.

The casing or external shell of the dust collector, as preferably constructed, has a cylindrical body portion 1 and a conical hopper-like lower portion 2, with a depending axial discharge spout 3. The top of the casing is preferably in the form of an annular conical plate 4, through which a cylindrical air outlet tube 5 extends both upward and downward, and is united therewith by an air-tight joint. Preferably the air outlet tube 5 extends about half way downward through the cylindrical portion 1 of the casing. The inlet spout 6 for the commingled air and dust, opens tangentially into the cylindrical shell section 1, through an opening 7 which is located above the lower end of the air outlet tube 5.

Rigidly secured to the lower end of the air outlet tube 5, is a depending conical deflector 8 which is formed with a multiplicity of circumferentially spaced air ports 9 and intervening deflecting plates 10, which latter are preferably formed for slitting the deflector body 8 and bending outward the partially severed portions to form the said ports 9 and deflecting blades 10. The deflecting blades 10, it is important to note, extend approximately tangentially to the conical surface of the deflector body 8, and extend in the direction in which the commingled air and dust are revolved when discharged from the spout 6 into the casing of the dust collector, as shown by arrows marked on Fig. 2.

To regulate the discharge of air out of the upper end of the air outlet tube 5, a damper, preferably in the form of a conical head 11, is located immediately over the upper end of said tube 5. Threaded guide rods 12 secured at their upper ends to the upper end of the outlet tube 5, are passed through perforations in the rim of the head 11, and the latter is adjustable on the said rods by coöperating nuts 13.

In the extreme lower end of the so-called deflector 8, is an axial opening $8^a$. The total conducting capacity of this opening $8^a$ and of the multiplicity of ports 9, should equal the conducting capacity of the air outlet tube 5.

The operation is substantially as follows: The air, dust, shavings or other material carried thereby, will as is usual, be blown into the dust collector through the spout 6, and entering the cylindrical portion 1 of the casing tangentially through the opening 7, will by centrifugal force, be caused to whirl rapidly around within the said cylindrical portion 1, and while under this whirling motion, which throws the heavier particles outward into contact with the casing, the air will be drawn off through the ports 9 and outlet tube 5, while the dust or heavy particles will be precipitated into the hopper 2, and from thence downward through the discharge spout 3. It is important to note that the air in passing upward and outward through the ports 9, must make an abrupt backward turn around the edges of the deflecting blades 10, so that any dust or light particles still carried thereby will be precipitated at these ports.

The head 11 will require setting in different positions under different conditions. For instance, variations in the intensity of the blast of the air blown into the casing, will require different adjustments of the said head in order to effect proper separation of the air from the dust or other material carried by the air into the casing. When the blast is turned on and the dust laden air is driven into the casing, the said head should be adjusted to a position in which the air will pass upward of the tube 5 without carrying any of the dust therewith, and yet it should not be set so close to the upper end of the said tube 5 as to give any unnecessary contraction in the air outlet passage. It will therefore be seen that the adjustment of this head or damper so-called, is a highly important feature.

In actual practice, a very large dust collector constructed as illustrated in the drawings, has been found highly efficient for the purposes had in view.

What we claim is:

In a dust collector, the combination with an upright casing having a cylindrical body portion and a depending hopper-like lower portion terminating in a depending discharge spout and also having an inlet spout opening tangentially into its cylindrical portion, of an air outlet tube extending axially upward from the interior of said casing and a depending conical deflector secured to the lower end of said air outlet tube, entirely below said tangential inlet passage and provided with a multiplicity of circumferentially spaced oblique deflecting blades and intervening air ports, which deflecting blades project obliquely outward in the circumferential direction in which the air is rotated and delivered into said casing from the tangential inlet passage.

In testimony whereof we affix our signatures in presence of two witnesses.

VICTOR T. JOHNSON.
CARL G. ARVIDSON.

Witnesses:
 ALICE V. SWANSON,
 HARRY D. KILGORE.